United States Patent [19]
Hamada

[11] Patent Number: 5,865,320
[45] Date of Patent: Feb. 2, 1999

[54] RACK

[75] Inventor: Katsutoshi Hamada, Osaka, Japan

[73] Assignee: Elecom Kabushiki Kaisha, Osaka-fu, Japan

[21] Appl. No.: 894,313

[22] PCT Filed: Dec. 17, 1996

[86] PCT No.: PCT/JP96/03670

§ 371 Date: Aug. 14, 1997

§ 102(e) Date: Aug. 14, 1997

[87] PCT Pub. No.: WO97/23749

PCT Pub. Date: Jul. 3, 1997

[30] Foreign Application Priority Data

Dec. 21, 1995 [JP] Japan ................................. 7-333377

[51] Int. Cl.⁶ ............................................. A47F 7/00
[52] U.S. Cl. ............................................. 211/40
[58] Field of Search ................... 211/40, 41.12, 211/195, 168; 312/9.54, 9.9; 206/387.15; D6/407

[56] References Cited

U.S. PATENT DOCUMENTS 5,301,819  4/1994  Moeken .
5,341,943  8/1994  Fraser ............................. 211/40
5,358,124  10/1994 Mueller ........................... 211/40
5,607,065  3/1997  Todd .............................. 211/40
5,647,487  7/1997  Reinhard ......................... 211/40

FOREIGN PATENT DOCUMENTS 7255544  10/1995  Japan .

Primary Examiner—Alvin Chin-Shue
Assistant Examiner—Sarah Purol
Attorney, Agent, or Firm—Jordan and Hamburg LLP

[57] ABSTRACT

A rack for holding a plurality of flat articles includes three elongated supports each having a longitudinal axis and each having longitudinal ends. Linking elements are connected to the elongated supports for supporting the elongated supports in a position in which the longitudinal axes of the elongated supports are parallel to one another and in which the longitudinal ends of the elongated supports are disposed at the apexes of a triangle. A pivotal mounting pivotably mounts at least one of the linking elements on at least one of the elongated supports to enable changing the relative position between the at least one elongated support and the at least one other elongated support. A plurality of spaced and parallel flange members are provided on each of the elongated supports for supporting edge portions of the flat articles in the spaces between the flange members.

20 Claims, 12 Drawing Sheets

RACK

BACKGROUND ART

This invention relates to a rack for accommodating flat articles such as floppy discs (FDs), compact discs (CDs), and video cassette tapes in a vertically or transversally aligned state.

Conventionally, there have been known racks of various types for office use or home use to accommodate a multitude of flat articles for the purpose of display and storage. A rack of such well known type is of a box type in which a frontal surface or a top surface is opened and the inside space is partitioned by shelves or partition members to accommodate articles vertically in a horizontal posture or transversally in an upright posture.

The conventional box type rack as mentioned above requires plates to cover five surfaces of a box, and a certain number of shelves or partition members as constituent elements. Accordingly, the number of parts is increased, and the area and weight for the parts is also increased, resulting in an increase of volume and weight of the rack as a whole.

Accordingly, the cost for material, production, and transportation is inevitably raised, while necessitating a large space in storage and in use.

SUMMARY OF THE INVENTION

In view of the above, an object of this invention is to provide a rack with a simple structure, less number of parts, reduced volume and weight as a whole, and low production cost, without the necessity of a large space.

Another object of this invention is to provide a rack capable of stably accommodating flat articles with a three-point support structure.

Still another object of this invention is to provide a rack capable of accommodating articles corresponding to the planar contour and size of the articles.

Yet another object of this invention is to provide a rack capable of maximally decreasing the number of parts and assembling with ease.

DISCLOSURE OF THE INVENTION

To solve the above problems, the rack according to this invention has adopted the following construction.

The invention, according to one embodiment is directed to a rack for accommodating plural flat articles vertically in a horizontal posture or transversally in an upright posture. The rack comprises: at least one pair of rod members disposed in parallel with a certain distance for receiving the article therebetween; retainer means for retaining the rod members with the certain distance in parallel; and plural flange members lined up in the longitudinal direction of each rod member with a certain interval for supporting a periphery of the article to retain the article in an accommodated state.

The retainer means may be a linking plate, and a set or plural sets of three rod members may be arranged such that each end of the rod members constitutes an apex of a triangle and one rod member of the adjacent sets is common when the rack comprises the plural sets. The adjacent rod members may be linked by the linking plate at respective lengthwise ends thereof.

The linking plate may be rotatably coupled to the rod member about the longitudinal axis of the rod member.

The retainer means may be a base member and each rod member may be mounted upright on the base member.

The retainer means comprise an expandable pillar including an outer cylinder and an inner cylinder slidably fitted in the outer cylinder, the end of which is connectable to the rod member, and a fixing mechanism for fixing a relative position of the inner cylinder with respect to the outer cylinder to compressingly mount the rod member between upper and lower horizontal planes with a certain tension.

The rod member may be constructed such that a shaft is integrally formed with the plural flange members lined up in the axial direction by the certain interval along an outer circumference thereof.

The rod member may be constructed such that plural rod pieces each provided with the flange member are coupled one over another axially in such a manner that the flange members opposing to one another by the certain interval.

Each rod piece may be formed with a hollow portion, and the rod member may be constructed such that a core rod is inserted through the hollow portions of the rod pieces.

Each rod piece may be formed with a hollow portion and an engaging portion of a small diameter at one end, and the rod pieces may be axially coupled one over another by fittingly mounting the engaging portion of the rod piece in the hollow portion of the another rod piece.

With the above arrangement, each rod member serves as a side plate or a rear plate for the rack, and the flange members serve as shelves or partition members for the rack. Accordingly, the construction of the rack as a whole can be simplified, compared to the conventional box type rack, while reducing the volume and weight of the rack.

As a result, the cost for material, production, and transportation can be lessened, while decreasing the space for the rack in storage and in use.

The article can be supported at three points by the three rod members disposed in a triangle, the opposite side rod members serve as right and left side plates for the rack, and the center rod member serves as a rear plate for the rack. Thereby, the flat article can be stably accommodated.

One set of rack unit consisting of three rod members or an assembly of plural sets of rack units as a whole may be foldable and expandable. Accordingly, the space for the rack can be further reduced by folding the rack to a closed state in storage, transportation, and in non-used state.

The distance between the opposite side rod members can be adjusted according to the planar contour and size of the article to be accommodated.

In the case where the rack is constructed into a zigzag shape in planar view by assembling the plural sets of rack units, the direction of inserting the article can be differentiated per rack unit, or the article can be accommodated in the opposite direction every other rack unit. Thus, display systems which would not have been conducted with use of the conventional rack can be adopted.

Each rod member may be mounted upright to the common base member such that the upstanding posture of the rack can be more stabilized, compared to the case where the rod members are linked each other by the linking plate at the opposite lengthwise ends thereof.

Merely compressingly mounting the rod member between e.g., a ceiling and a floor can facilitate assembly of the rack. Only two rod members would do, if a side wall of a building is utilized as a rear plate for the rack.

The rod member may be constructed by a shaft and plural flange members integrally formed along an outer circumference of the shaft, the production cost for the rod member can be reduced.

The rod pieces each provided with the flange member may be axially coupled one over another to form the rod member, increasing or decreasing the number of rod pieces can desirably adjust the length of the rod member.

Where the rod pieces are axially coupled by inserting the core rod in the hollow of the rod pieces, the rod member can be reinforced by the existence of core rod. This arrangement is effective in producing a rack of a multiple shelf type.

Where the rod pieces with the hollow portion are directly coupled one over another, merely increasing or decreasing the number of rod pieces can adjust the length of the rod member easily.

BEST MODE FOR CARRYING OUT THE INVENTION

Figure 1:
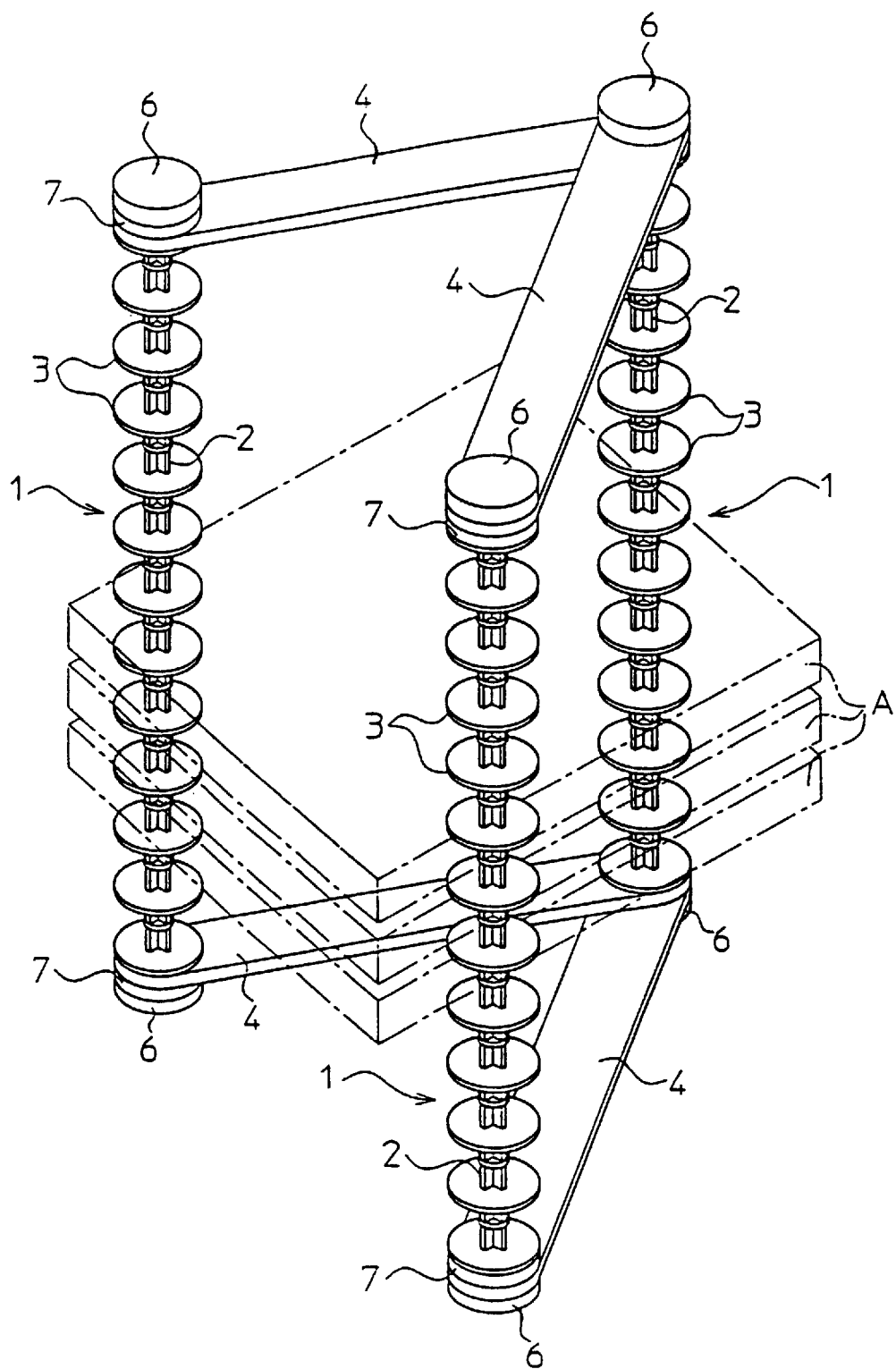
FIG. 1 is a perspective view of a rack as a first embodiment according to this invention.
Figure 2:
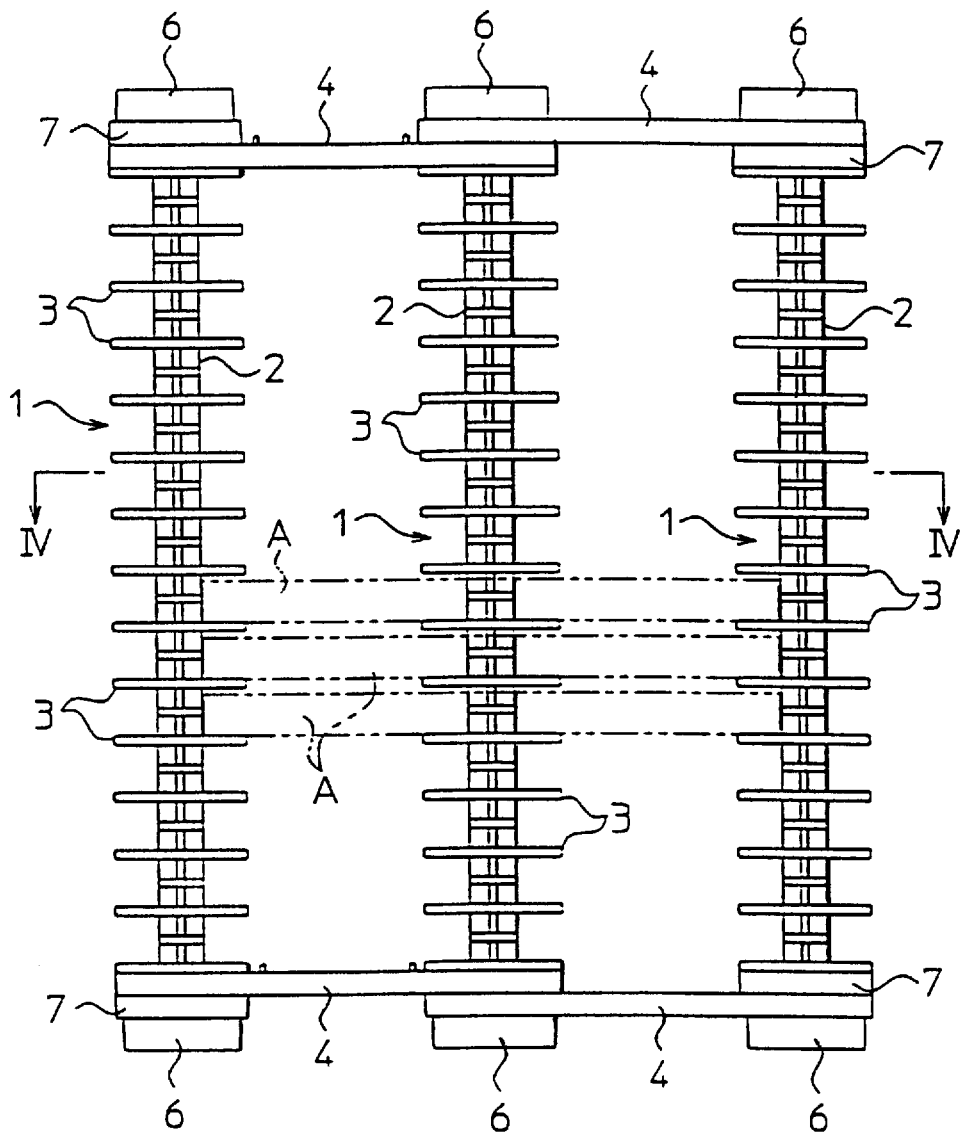
FIG. 2 is a front view of the rack.
Figure 3:
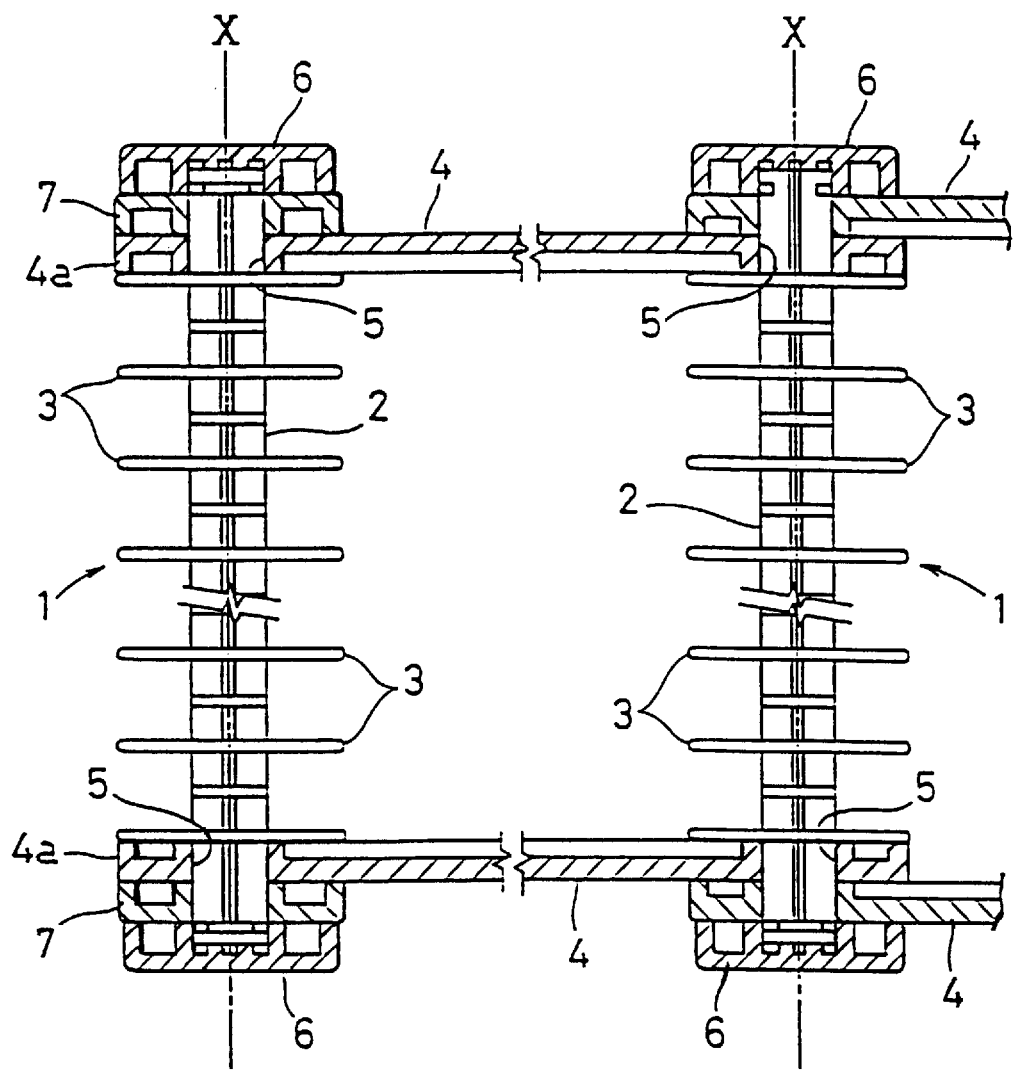
FIG. 3 is a partially enlarged cross sectional view of the rack.
Figure 4:
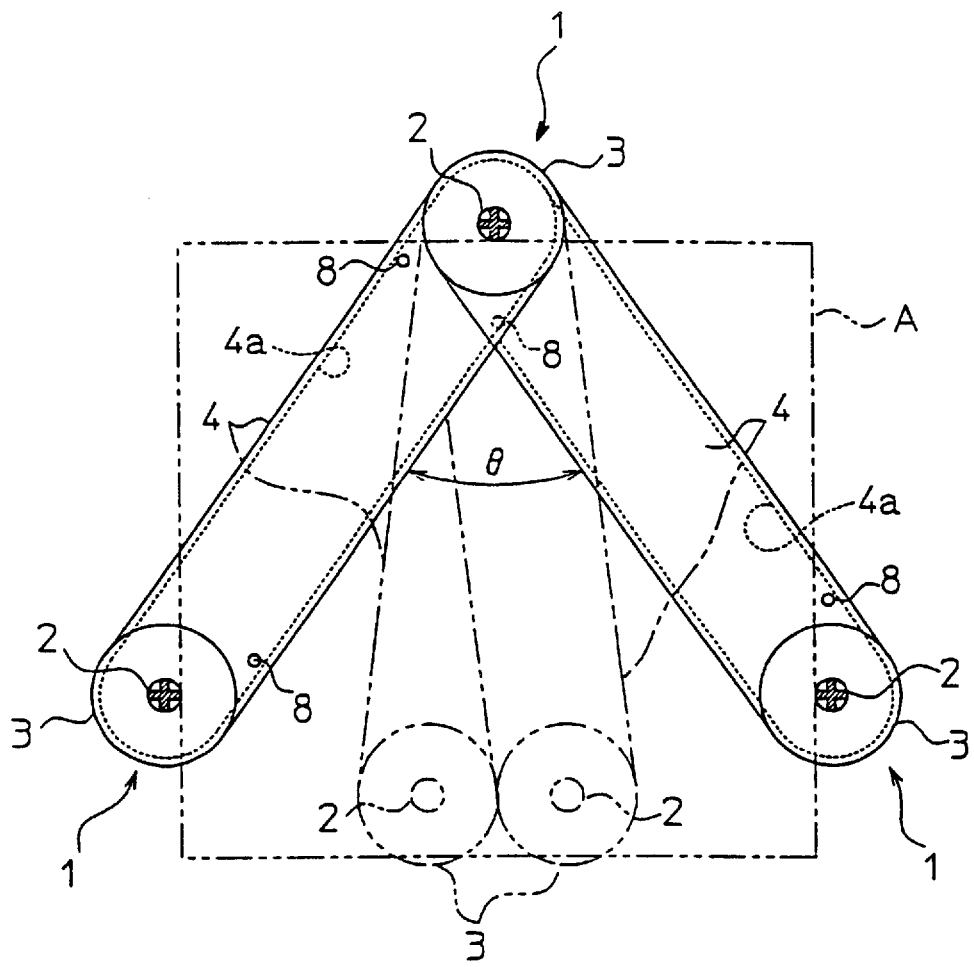
FIG. 4 is a cross sectional view of the rack taken along the line IV—IV in FIG. 2.

Preferred embodiments of this invention will be described with reference to the accompanying drawings.

First Embodiment (see FIGS. 1 to 4):

A rack according to the first embodiment comprises three rod members 1 disposed in a triangle, and a linking plate 4 each for linking the adjacent rod members 1 at opposite upper and lower ends thereof.

Each rod member 1 is constructed such that a shaft 2 is integrally formed with a multitude of circular flange members 3 around an outer circumference thereof lined up in the longitudinal direction by a certain interval. The shaft 2 and the flange members 3 are integrally molded by plastic molding using such as a polypropylene.

The shaft 2 is molded into a cross-shape in cross section to prevent partial deformation of a molded product, and has a circular shape in cross section in the middle between the adjacent flange members 3 to avoid obstruction in mounting articles in the rack.

The linking plate 4 is formed with a hole 5 at opposite ends thereof. The upper and lower ends of the rod members 1 and 1 adjacent to each other are fitted in the corresponding hole 5 of the linking plates 4, and the fitting state of the linking plate 4 and the rod member 1 is secured by a cap 6. Indicated at numeral 7 is a spacer.

The linking plates 4 keep the adjacent rod members 1 and 1 in upright parallel posture spaced apart by a certain distance.

The linking plate 4 is rotatably mounted to the rod member 1 about an axis X of the rod member 1. Thereby, the rack as a whole is expandable (openable) to a V-shape in planar view when in use, while foldable to a closed state where the opposite side rod members 1 and 1 come into contact with each other, as shown by phantom line in FIG. 4, in transporting the rack or non-used state of the rack.

The linking plate 4 is formed with a downward jutting rim 4a along a perimeter thereof, and a projection 8 is formed at a top surface of the linking plate at proximity of the opposite ends of the linking plate. Engagement of the projection 8 of one linking plate with an inner side of the rim 4a of the adjacent linking plate restricts a further opening of the rack (i.e., determines the maximum open angle θ of the linking plates 4 in a used state of the rack).

Note that the distance of the adjacent rod members 1, the maximum open angle θ, the interval between the flange members 3 are determined according to the planar dimension and thickness of article to be accommodated in the rack.

A variation of the planar dimension of article to a certain extent can be coped by adjusting the distance between the opposite side rod members 1 and 1 (i.e., open angle of the rack).

The rack according to this invention is used for display, exhibition and storage of flat articles A such as CDs, FDs, and video cassette tapes for office use or home use (basically, articles in this invention indicate four-sided flat articles, and accordingly, if the articles are CDs, the CDs are accommodated in a four-sided case).

More specifically, when the rack is to be used, the rack is opened up in an upright posture (like a fan) in such a manner that articles A are inserted between the adjacent rod members 1 and 1 to support each article A at the flange members 3 disposed at the same height level of the rod members 1 and 1.

In this way, the article A is supported at three points, i.e., at the respective middle points of right and left sides and rear side of the article. That is, the article is accommodated in the rack in a vertically aligned state by the number identical to the number of flange members 3 in a state that a lateral displacement and a backward displacement are restricted by the opposite side rod members 1 and 1 and the center rod member 1 respectively.

According to the rack having the above construction, the respective rod members 1 serve as a side plate or a rear plate, while the flange members 3 of each rod member 1 serve as shelves. Accordingly, the construction of the rack according to this invention is far more simplified, compared to the conventional box type rack, while reducing the volume, weight, and space for the rack.

Furthermore, the three rod members 1 arranged in a triangle can support the article A at three points and restrict the lateral and backward movement of the article. Accordingly, the article A can be stably accommodated in the rack.

In addition, since the rack is foldable and expandable, the space for the rack during storage, transportation and in non-use state can be further reduced by folding the rack to a closed state.

Figure 5:
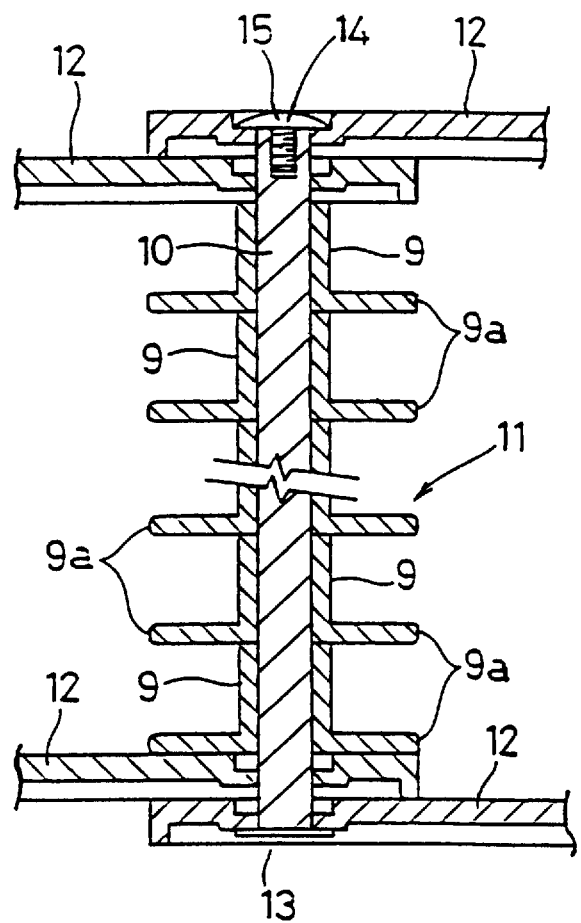
FIG. 5 is a partially cross sectional view of a rack as a second embodiment according to this invention.

Second Embodiment (see FIG. 5):

Only the differences between the first and second embodiments are described hereinafter.

In the first embodiment, the rod member 1 is integrally formed by molding. In the second embodiment, a rod member 11 is constructed as follows. Hollow cylindrical rod pieces 9 each provided with a flange member 9a at the lower end thereof are vertically assembled one over another in a state that the flange members 9a of the adjacent rod pieces 9 oppose by a certain interval and a core rod 10 is inserted through the hollows of the rod pieces 9. Indicated at numeral 12 is a linking plate for linking the rod members 11.

The core rod 10 has a stopper pin 13 horizontally inserted through the lower end thereof and a threaded hole 14 at the upper end thereof. The core rod 10 is fixedly linked to the linking plates 12 such that the stopper pin 13 is engaged with the underside of the lower linking plate 12 and a threaded screw 15 is engageably fitted in the threaded hole 14 via the upper linking plate 12.

Figure 6:
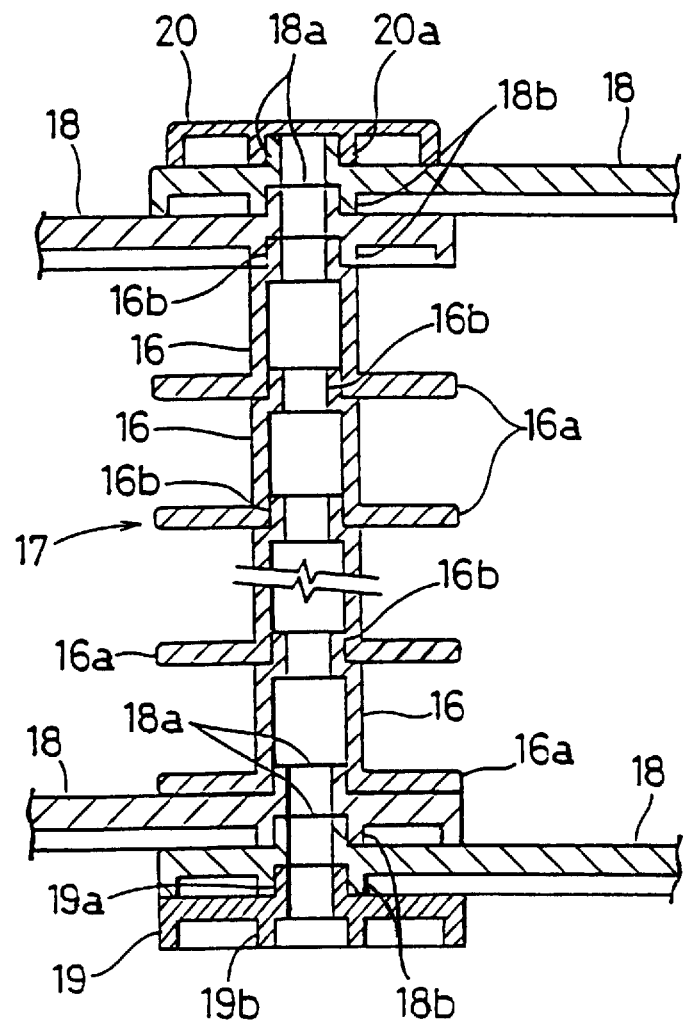
FIG. 6 is a partially cross sectional view of a rack as a third embodiment according to this invention.

Third Embodiment (see FIGS. 6 and 7):

In the third embodiment, a rod member 17 is constructed such that a multitude of cylindrical rod pieces 16 each provided with a flange member 16a at the lower end thereof are vertically assembled one over another. Numeral 18 indicates a linking plate, 19 indicates a spacer, and 20 indicates a cap.

The rod piece 16 has an engaging portion 16b of a small diameter at the upper end thereof. The rod pieces 16 are linked one another such that the engaging portion 16b of one rod piece is fitted in the lower end of the adjacent upper rod piece.

Figure 7:
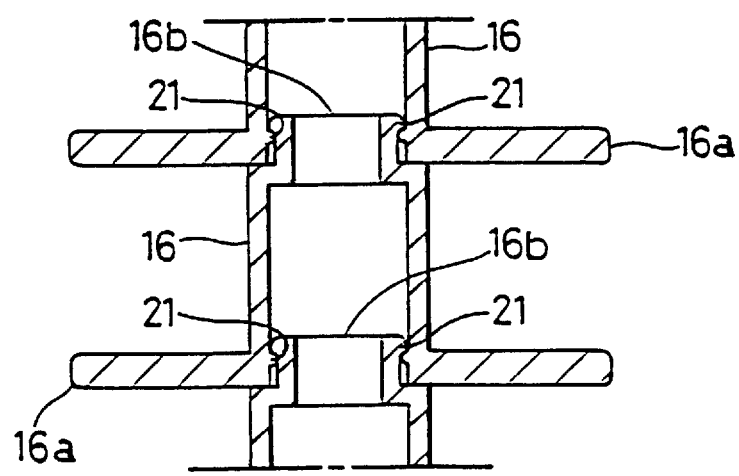
FIG. 7 is a partially enlarged view of the third rack.

To secure the linkage of rod pieces at the engaging portion, as shown in FIG. 7, the outer circumference of the engaging portion 16b and the inner circumference of the lower portion of the rod piece 16 are formed, in its entirety, with a projection 21. Thereby, the rod pieces 16 adjacent one another are pressingly linked by abutting engagement of the projections 21.

The linking plate 18 has an upper linking portion 18a and a lower linking portion 18b at an upper surface and a lower surface of opposite ends thereof, respectively. The upper and lower linking portions 18a and 18b are in the form of a cylinder with a small axial dimension. The lower linking portion 18b of the upper linking plate 18 is fittingly linked to the engaging portion 16b of the uppermost rod piece 16 or to the upper linking portion 18a of the adjacent linking plate 18. The upper linking portion 18a of the lower linking plate 18 is fittingly linked to the lower end of the lowermost rod piece 16 or to the lower linking portion 18b of the adjacent linking plate 18.

The spacer 19 is also provided with upper and lower linking portions 19a and 19b, similar to the upper and lower linking portions 18a and 18b of the linking plate 18. As shown in the drawing, when the spacer 19 is mounted on the lower end of the rod member 17, the upper linking portion 19a is fittingly linked to the lower linking portion 18b of the lower linking plate 18.

The cap 20 has a linking portion 20a at the underside thereof. The linking portion 20a is fittingly linked to the upper linking portion 18a of the upper linking plate 18.

Although not illustrated, the projection 21 formed at the rod piece 16 is also provided for the spacer 19 and for the cap 20.

According to the second and third embodiments, as well as basic effects such as structural simplification, the height of the rack can be desirably adjusted by increasing or decreasing the number of rod pieces 9 (16) (and by replacing the core rod 10 in the second embodiment).

In particular, according to the third embodiment, the height adjustment can be facilitated merely by increasing or decreasing the number of rod pieces 16.

Moreover, the second embodiment is more advantageous in producing a rack of a multiple shelf type, compared to the third embodiment, because the core rod 10 reinforces the axial strength of the rod member 17.

Furthermore, according to the second and third embodiments, the rod pieces 9 (16) may be divided into several groups by identifying a certain number of adjacent rod pieces with the same color. In this case, the rack becomes more user-friendly such that e.g., CDs can be categorized according to genre.

Figure 8:
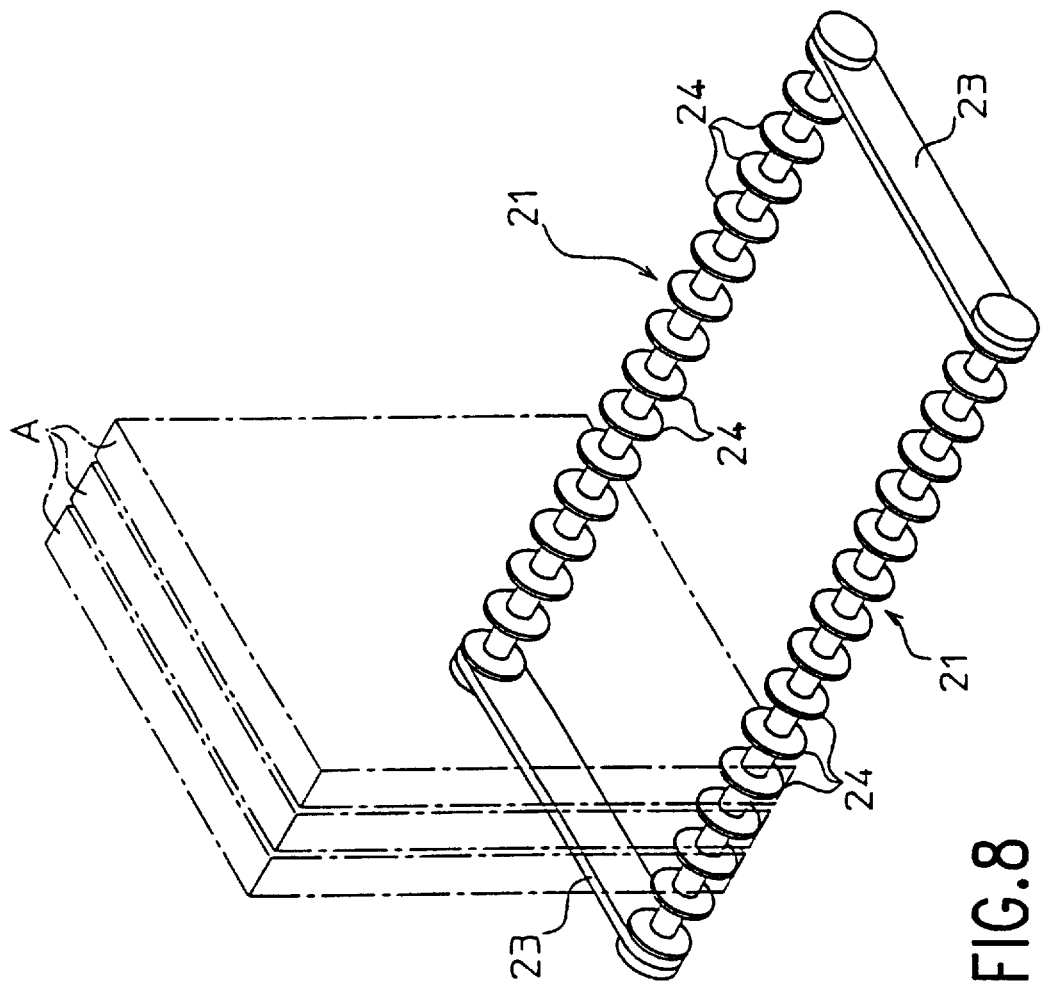
FIG. 8 is a perspective view of a rack as a fourth embodiment according to this invention.

Fourth Embodiment (see FIG. 8):

The rack according to the foregoing embodiments supports articles A in a horizontal posture in a vertically aligned state. A rack according to this embodiment is designed to transversally support articles A in an upright posture by the following arrangement. That is, rod members 22 and 22 are linked horizontally in parallel by linking plates 23 and 23, and the article A in an upright posture is supported bridgingly at the opposite rod members 22 and 22.

In this case, the article A is upright supported to the rod members 22 and 22 such that opposite lower ends of the article A are sandwiched between adjacent flange members 24 of the rod members 22 and 22.

In the fourth embodiment, any arrangement of the rod member 1, 11 or 17 and the linking mechanism thereof in the first to the third embodiments may be applicable to the arrangement of the rod member 22 and the linking mechanism thereof.

Figure 9:
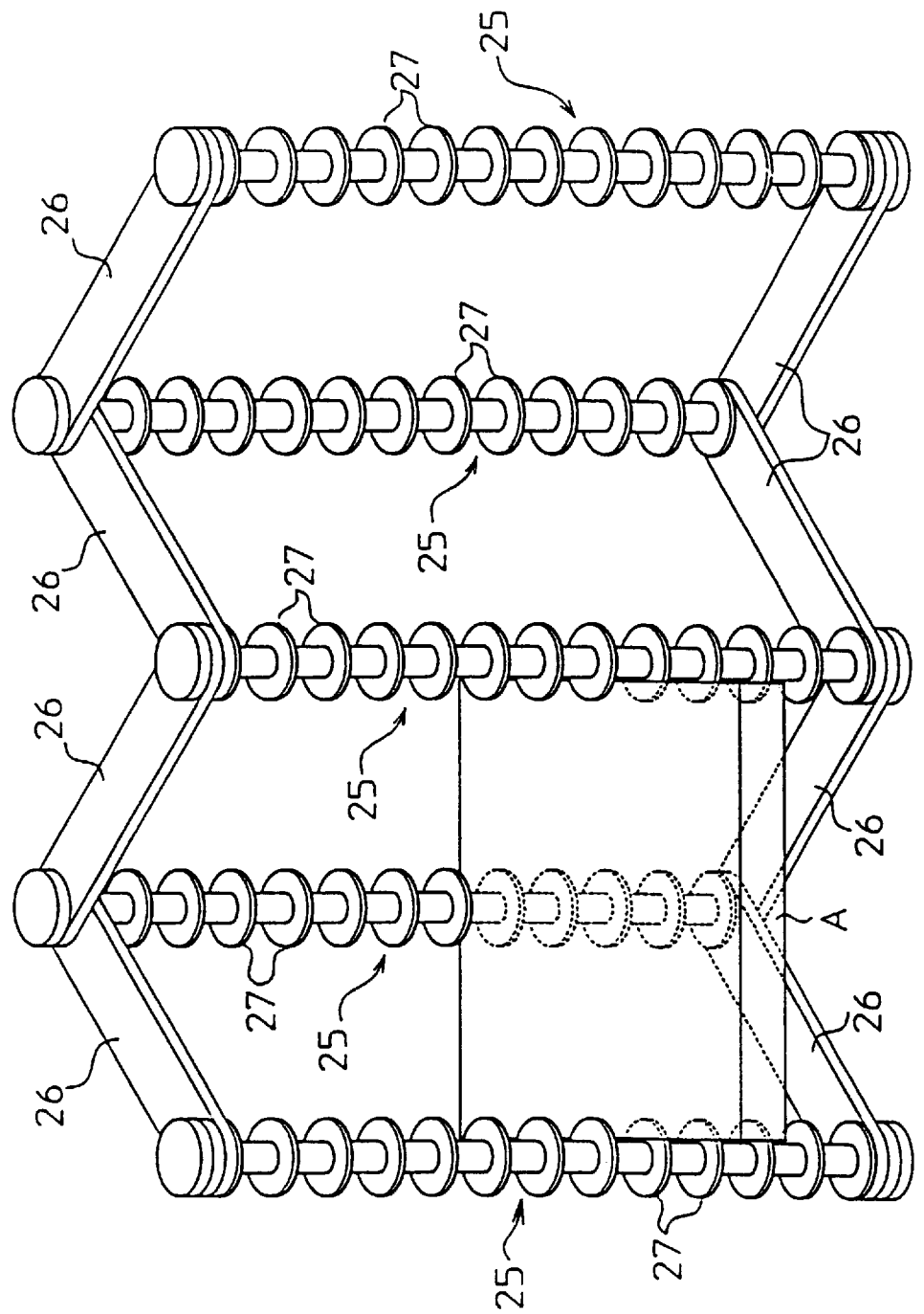
FIG. 9 is a perspective view of a rack as a fifth embodiment according to this invention.

Fifth Embodiment (see FIG. 9):

In this embodiment, two sets of rack units are combinedly assembled such that one rack unit is linked to the other rack unit by means of a common rod member. Specifically, one of the opposite side rod members in the one rack unit serves as the other of the opposite side rod members in the other rack unit. With this arrangement, the rack has a zigzag shape in plan view. Each rack unit comprises three rod members 25 and a linking plate 26 each for linking the adjacent rod members 25. Numeral 27 indicates a flange member for the rod member 25.

According to the fifth embodiment, the direction of inserting the article A can be differentiated per rack unit, or the article A can be accommodated in the opposite direction every other rack unit. Thus, display systems which would not have been conducted with use of the conventional rack can be realized.

Figure 10:
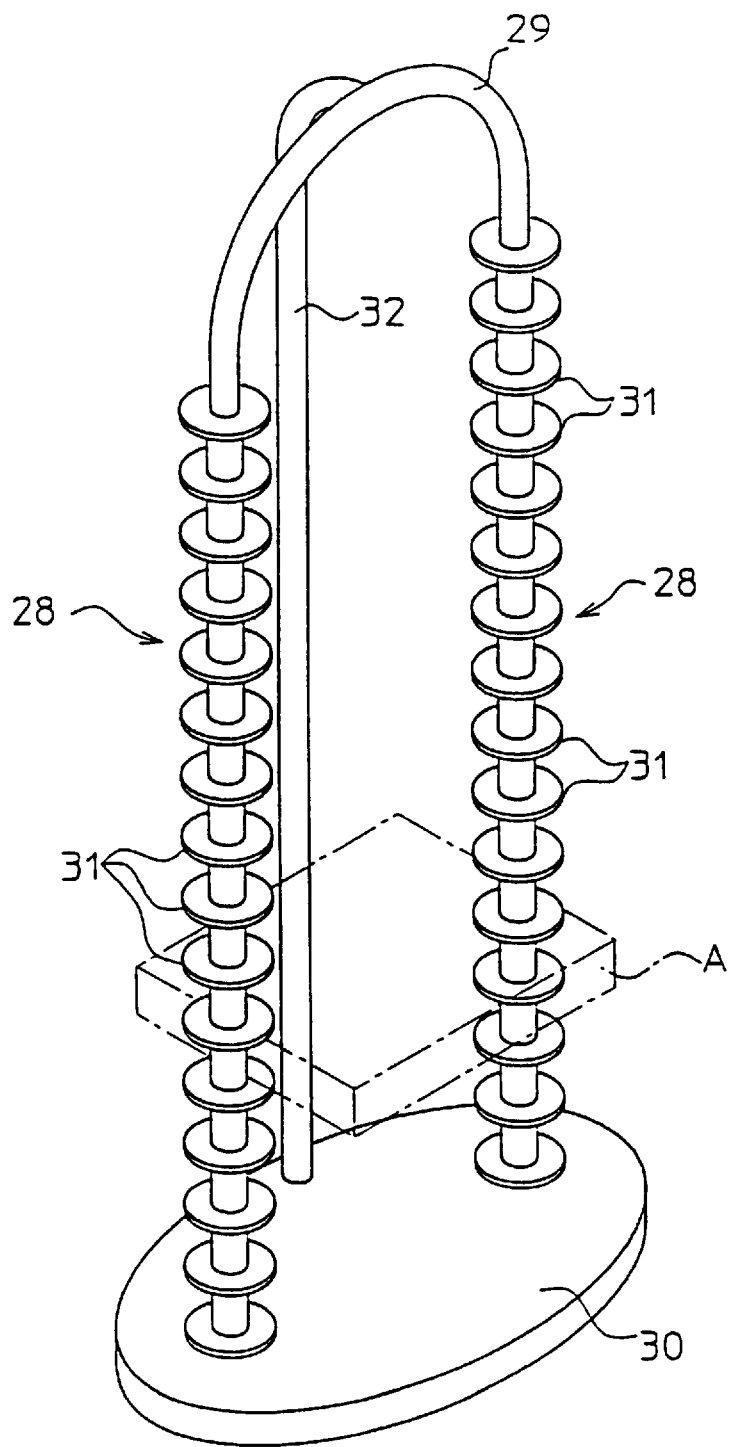
FIG. 10 is a perspective view of a rack as a sixth embodiment according to this invention.

Sixth Embodiment (see FIG. 10):

In this embodiment, two rod members 28 and 28 having a vertical alignment/link structure shown in the third embodiment are linked by inserting an inverted U-shape pillar 29 through the hollow of the rod members 28 and 28, and the opposite ends of the pillar 29 are fixedly mounted to a base member 30 of a circular shape (or rectangular shape). With this construction, the rod members 28 and 28 are supported in upright parallel posture spaced apart by a certain distance. Numeral 31 denotes a flange member for the rod member 28.

A sub pillar 32 is mounted between a top (intermediate) portion of the pillar 29 and the base member 30 behind the rod members 28 and 28. The sub pillar 32 serves as a stopper to restrict a backward displacement of an article A.

The rod members 28 and 28 in this embodiment can be more stably supported in an upright posture, compared to the first to the fifth embodiments.

Note that the base-assisted method according to this embodiment is applicable to the case where three or more rod members are to be employed.

Figure 11:
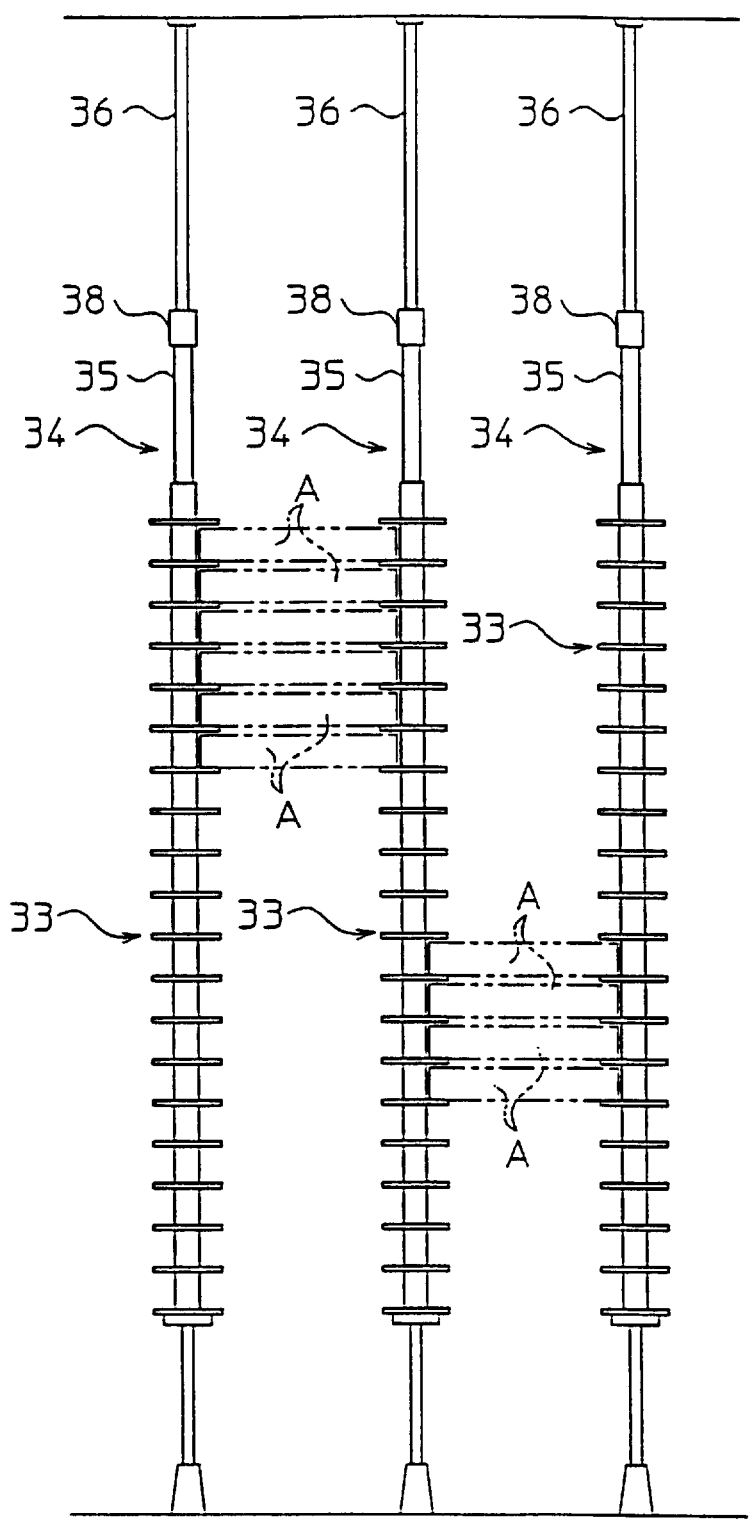
FIG. 11 is a front view of a rack as a seventh embodiment according to this invention.

Seventh Embodiment (see FIGS. 11 and 12):

A rack according to the seventh embodiment is of a strut type. Specifically, the rack comprises plural rod members 33 of vertical alignment/link structure shown in the third embodiment, and an expandable pillar 34 fixedly mounted between upper and lower horizontal planes (e.g., between a ceiling and a floor) through a hollow of each rod member 33 with a certain tension. With this construction, the rod members 33 are supported in upright parallel posture spaced apart by a certain distance.

The expandable pillar 34 includes an outer cylinder 35 and an inner cylinder 36 fitted in the outer cylinder 35 to be expandable and contractible, and has its length settable at any size with a certain tension by a fixing mechanism.

Figure 12:
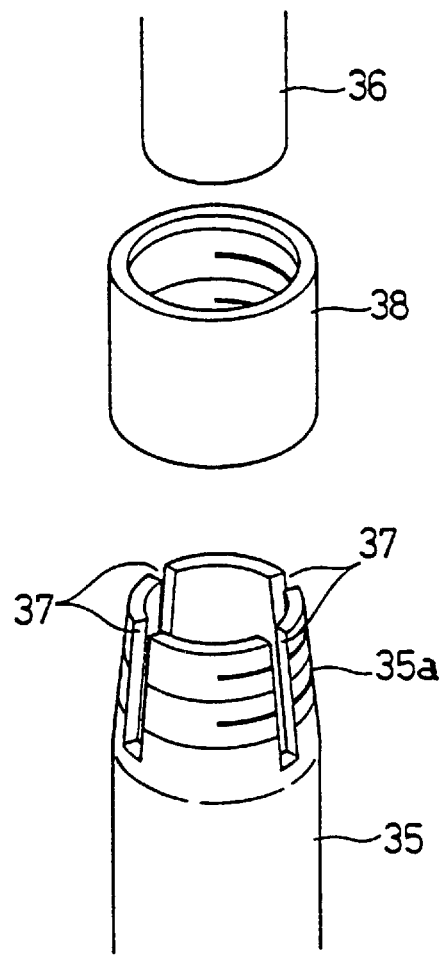
FIG. 12 is a partially exploded perspective view of an expandable pillar for use in the seventh rack.

The fixing mechanism is, as shown in FIG. 12, constructed such that an upper end 35a of the outer cylinder 35 is formed into a taper as approaching the end. The upper end 35a is externally threaded with plural vertical slits 37.

The vertical slits 37 allow the upper end 35a to be radially expandable and contractible in the following manner. When an internally threaded tubular member 38 is engageably fitted over the upper end 35a, the upper end 35a has its radial size reduced to fixedly mount the inner cylinder 36 in the outer cylinder 35. Thereby, the expandable pillar 34 is set to a desired length.

According to this embodiment, the rack can be assembled in a simplified manner by fixedly mounting the rod members 33 between the upper and lower horizontal planes with a certain tension. Use of a side wall of a building where the rack is to be installed as a rear plate for the rack can set the number of rod members to two.

A material for the rod member used in the rack according to this invention is not limited to a plastic, but may be a metallic material such as aluminum. In the case where the rod member is made of a metallic material, in place of the vertical alignment/link mechanism shown in the third embodiment where the rod pieces are axially assembled one over another, means for linking adjacent rod pieces by fastening means such as a screw may be applicable.

According to the invention, the rack is not limited to accommodate disc members such as CDs and FDs, but may be widely used to accommodate flat articles of various types such as dishes, books, and framed posters.

EXPLOITATION IN INDUSTRY

As mentioned above, the rack according to this invention is constructed such that at least one pair of rod members are retained in parallel with a certain distance by retainer means and flange members provided on each rod member support a periphery of articles. With this construction, the rod member serves as a side plate or a rear plate, and the flange members serve as shelves or partition members. Thereby, the construction of the rack as a whole can be simplified, compared to the conventional box type rack, while reducing the volume and weight of the rack.

As a result, the cost for material, production, and transportation can be lessened, while decreasing the space for rack in storage and in use.

According to the arrangement of claim 2, since the article can be supported at three points by the three rod members disposed in a triangle, the opposite side rod members serve as right and left side plates for the rack, and the center rod member serves as a rear plate for the rack. Thereby, the flat article can be stably accommodated.

According to the arrangement of claim 3, one set of rack unit consisting of three rod members or assembly of plural sets of rack units as a whole is foldable and expandable. Accordingly, the space for the rack can be further reduced by folding the rack to a closed state in storage, transportation, and in non-used state.

The distance between the opposite side rod members can be adjusted according to the planar contour and size of the article to be accommodated in the rack.

In the case where the rack is constructed into a zigzag shape in planar view by assembling the plural sets of rack units, the direction of inserting the article can be differentiated per rack unit, or the article can be accommodated in the opposite direction every other rack unit. Thus, display systems which would not have been conducted with use of the conventional rack can be adopted.

According to the arrangement of claim 4 where each rod member is mounted upright to the common base member, the upstanding posture of the rack can be more stabilized, compared to the case where the rod members are linked each other by the linking plate at the opposite lengthwise ends thereof.

According to the arrangement of claim 5, compressingly mounting the rod member between e.g., a ceiling and a floor can facilitate assembly of rack. Further, only two rod members would do, if a side wall of a building is utilized as a rear plate for the rack.

According to the arrangement of claim 6 where the rod member is constructed by a shaft and plural flange members integrally formed along an outer circumference of the shaft, the production cost for the rod member can be reduced.

According to the arrangement of claim 7 where the rod pieces each provided with the flange member are axially coupled one over another to form the rod member, the length of the rod member can be desirably adjusted by increasing or decreasing the number of rod pieces.

Further, according to the arrangement of claim 8 where the rod pieces are axially coupled by inserting the core rod through the hollow portions of the rod pieces, the rod member can be reinforced by the existence of core rod. This arrangement is effective in producing a rack of a multiple shelf type.

According to the arrangement of claim 9 where the rod pieces with the hollow portions are directly coupled one over another, merely increasing or decreasing the number of rod pieces can adjust the length of the rod member easily.

I claim:

1. A rack for holding a plurality of flat articles comprising:

three elongated supports each having a longitudinal axis and each having longitudinal ends;

linking elements connected to said elongated supports for supporting said elongated supports in a position in which the longitudinal axis of the elongated supports are parallel to one another and in which the longitudinal ends of the elongated supports are disposed at the apexes of a triangle;

a pivotal mounting pivotably to mounting at least one of said linking elements on at least one of said elongated supports to enable changing the relative position between said at least one elongated support and said at least one other elongated support; and a plurality of spaced and parallel flange members on each of said elongated supports for supporting edge portions of said flat articles in the spaces between said flange members.

2. The rack according to claim 1, wherein some of said linking members constitute a base member, and each of said elongated supports is mounted upright on the base member.

3. The rack according to claim 1, wherein at least one of said elongated supports includes a shaft integrally formed with the plural flange members lined up in the axial direction at spaced intervals over an outer surface of said shaft.

4. The rack according to claim 1, wherein at least one of said elongated supports is formed with plural rod pieces each having one of said flange members, said rod pieces being coupled one to another axially in such a manner that the flange members are opposed to one another in spaced relationship.

5. The rack according to claim 4, wherein each rod piece is formed with a hollow portion, and said at least one elongated support further comprises a core rod inserted through the hollow portions of the rod pieces.

6. The rack according to claim 4, wherein each rod piece is formed with a hollow portion and an engaging portion, said hollow portion having an outer diameter greater than the outer diameter of said engaging portion, said rod pieces being axially coupled one to another by fittingly mounting the engaging portion of one rod piece in the hollow portion of another rod piece.

7. A rack according to claim 1 wherein said pivotal mounting enables adjusting the spacing between said first and third elongated supports to accommodate flat articles of differing size.

8. A rack according to claim 1 wherein said flange members are circular discs.

9. A rack according to claim 8 wherein said circular discs have outer perimeters extending 360 degrees.

10. A rack for holding a plurality of flat articles comprising:
   first, second and third elongated supports each having a longitudinal axis and each having longitudinal ends;
   linking elements between said first and second elongated supports and between said first and third elongated supports for supporting said first to third elongated supports in a position in which the longitudinal axes of the first to third elongated supports are parallel to one another and in which the longitudinal ends of the first to third elongated supports are disposed at the apexes of a triangle;
   a pivotal mounting pivotally mounting at least one of said linking elements on said first elongated support for pivotal movement about the longitudinal axis of said first elongated support to thereby provide for disposing said first to third elongated supports in a plurality of different relative positions including an open position and a closed position;
   said first to third elongated supports when in said open position being disposed at the apexes of an isosceles triangle having two equal angles of a first magnitude;
   said first to third elongated supports when in said closed position being disposed at the apexes of an isosceles triangle having two equal angles of a second magnitude less than said first magnitude; and
   a plurality of spaced and parallel flange members on each of said elongated supports for supporting edge portions of said flat articles in the spaces between said flange members when said first to third elongated supports are in said open position.

11. A rack according to claim 10 wherein said first to third elongated supports when in said open position are disposed at the apexes of an equilateral triangle.

12. A rack according to claim 10 wherein said second and third elongated supports are juxtaposed to one another when said first, second to third elongated supports are in said closed position.

13. A rack according to claim 11 wherein the flange members on said second elongated support contact the flange members on said third elongated support when said first to third elongated supports are in said closed position.

14. A rack according to claim 10 wherein said pivotal mounting pivotally mounting at least one of said linking elements on said first elongated support is a first pivotal mounting, said linking element between said first and second elongated supports is a first linking element and said linking element between said first and third elongated supports is a second linking element, said first linking element constituting said at least one linking element, and further comprising a second pivotal mounting pivotably mounting said second linking element on said first elongated support.

15. A rack according to claim 14 wherein each of said first to third elongated supports have first and second terminating end portions, said first linking element comprising first and second linking parts, said first linking part extending between said first terminating end portions of said first and second elongated supports, said second linking part extending between said second terminating end portions of said first and second elongated supports.

16. A rack according to claim 14 wherein said second linking element comprises third and fourth linking parts, said third linking part extending between said first terminating end portions of said first and third elongated supports, said fourth linking part extending between said second terminating end portions of said first and third elongated supports.

17. A rack according to claim 10 further comprising a stop on at least one of said linking element engageable with another linking element to determine said open position.

18. A rack for holding a plurality of flat articles comprising:
   first, second and third elongated support means each having a longitudinal axis and each having longitudinal ends;
   linking means between said first and second elongated support means and between said first and third elongated support means for supporting said first to third elongated support means in a position in which the longitudinal axes of the first to third elongated support means are parallel to one another and in which the longitudinal ends of the first to third elongated support means are disposed at the apexes of a triangle;
   a pivotal means pivotally mounting at least one of said linking means on said first elongated support means for pivotal movement about the longitudinal axis of said first elongated support means to thereby provide for disposing said first to third elongated support means in a plurality of different relative positions including an open position and a closed position;
   said first to third elongated support means when in said open position being disposed at the apexes of an isosceles triangle having two equal angles of a first magnitude;
   said first to third elongated support means when in said closed position being disposed at the apexes of an isosceles triangle having two equal angles of a second magnitude less than said first magnitude; and
   a plurality of spaced and parallel flange means on each of said elongated support means for supporting edge portions of said flat articles in the spaces between said flange means when said first to third elongated support means are in said open position.

19. A rack for holding a plurality of flat articles comprising:
   first to fifth elongated supports each having a longitudinal axis and each having longitudinal ends;
   first linking elements between said first and second elongated supports and between said first and third elongated supports for supporting said first to third elongated supports in a position in which the longitudinal axes of the first to third elongated supports are parallel to one another;

a first pivotal mounting pivotally mounting at least one of said first linking elements on said first elongated support for pivotal movement about the longitudinal axis of said first elongated support to thereby provide for disposing said first to third elongated supports in a plurality of different relative positions including a first open position and a first closed position;

said first to third elongated supports when in said first open position being disposed at the apexes of a first isosceles triangle having two equal angles;

said first to third elongated supports when in said first closed position being disposed at the apexes of a second isosceles triangle having two equal angles less than the equal angles of said first isosceles triangles;

second linking elements between said third and fourth elongated supports and between said fourth and fifth elongated supports for supporting said third to fifth elongated supports in a position in which the longitudinal axes of the third to fifth elongated supports are parallel to one another, a second pivotal mounting pivotally mounting at least one of said second linking elements on said fourth elongated support for pivotal movement about the longitudinal axis of said fourth elongated support to thereby provide for disposing said third to fifth elongated supports in a plurality of different relative positions including a second open position and a second closed position;

said third to fifth elongated supports when in said second open position being disposed at the apexes of a third isosceles triangle having two equal angles;

said third to fifth elongated supports when in said second closed position being disposed at the apexes of a fourth isosceles triangle having two equal angles less than the equal angles of said third isosceles triangle; and a plurality of spaced and parallel flange members on each of said first to fifth elongated supports for supporting edge portions of said flat articles in the spaces between said flange members when said first to third elongated supports are in said first open position and said third to fifth elongated supports are in said second open position.

20. A rack disposed between upper and lower generally horizontal structures for holding a plurality of flat articles comprising:

a plurality of elongated and vertical rod elements extending between said upper and lower generally horizontal structures;

adjusting mechanisms on each of said rod elements for adjusting the vertical length of each rod element between a plurality of positions including a retaining position and a release position;

the vertical length of each rod element when in said retaining position being such as to engage said upper and lower generally horizontal structures under tension to thereby effect retention of said rod elements in a fixed upright position between said upper and lower generally horizontal structures;

the vertical length of each of said rod elements when in said release position being such as to enable release of said tension and to facilitate installation of said rod elements into said retaining position and removal of said rod elements from said retaining position; and a plurality of spaced and parallel flange members supported on each of said rod elements for supporting edge portions of said flat articles in the spaces between said flange members when said plurality of rod elements are in said retaining position.

* * * * *